(12) United States Patent
Burgess et al.

(10) Patent No.: US 11,278,797 B2
(45) Date of Patent: Mar. 22, 2022

(54) CONTROLLER FOR VIDEO GAME CONSOLE

(71) Applicant: Ironburg Inventions, Ltd., Wincanton (GB)

(72) Inventors: Simon Burgess, Leicester (GB); Duncan Ironmonger, Atlanta, GA (US)

(73) Assignee: Ironburg Inventions Limited, Wincanton (GB)

( * ) Notice: Subject to any disclaimer, the term of this patent is extended or adjusted under 35 U.S.C. 154(b) by 0 days.

(21) Appl. No.: 16/362,137

(22) Filed: Mar. 22, 2019

(65) Prior Publication Data
US 2019/0217188 A1    Jul. 18, 2019

Related U.S. Application Data

(63) Continuation of application No. 14/754,789, filed on Jun. 30, 2015, now Pat. No. 10,286,305, which is a continuation of application No. 14/141,840, filed on Dec. 27, 2013, now Pat. No. 9,089,770, which is a continuation of application No. 13/162,727, filed on Jun. 17, 2011, now Pat. No. 8,641,525.

(51) Int. Cl.
| | | |
|---|---|---|
| A63F 13/24 | (2014.01) | |
| A63F 13/20 | (2014.01) | |
| A63F 13/21 | (2014.01) | |
| A63F 13/90 | (2014.01) | |
| A63F 9/24 | (2006.01) | |

(52) U.S. Cl.
CPC .............. *A63F 13/24* (2014.09); *A63F 9/24* (2013.01); *A63F 13/20* (2014.09); *A63F 13/21* (2014.09); *A63F 13/90* (2014.09); *A63F 2009/2402* (2013.01); *A63F 2300/1006* (2013.01); *A63F 2300/1043* (2013.01)

(58) Field of Classification Search
CPC .......... A63F 13/08; A63F 13/20; A63F 13/24; A63F 2300/10; A63F 2300/1043
See application file for complete search history.

(56) References Cited

U.S. PATENT DOCUMENTS

| | | | | | |
|---|---|---|---|---|---|
| 4,552,360 | A | * | 11/1985 | Bromley ................. | A63F 13/06 463/38 |
| 4,887,966 | A | * | 12/1989 | Gellerman ............ | G06F 3/0383 463/38 |
| D316,879 | S | * | 5/1991 | Shulman ...................... | D14/414 |
| 5,207,426 | A | * | 5/1993 | Inoue ...................... | A63F 13/06 463/36 |
| D377,198 | S | * | 1/1997 | Oikawa ........................ | D14/401 |
| D379,203 | S | * | 5/1997 | Oikawa ........................ | D14/401 |

(Continued)

OTHER PUBLICATIONS

"N-Control Avenger Xbox 360 Controller Mount," by Snazzy Labs, published Feb. 5, 2011. Source: https://www.youtube.com/watch?v=vCVzn9hhr5A (Year: 2011).*

(Continued)

*Primary Examiner* — Steven J Hylinski
(74) *Attorney, Agent, or Firm* — Walters & Wasylyna LLC

(57) ABSTRACT

An improved controller for a game console that is intended to be held by a user in both hands in the same manner as a conventional controller, which has controls on the front operable by the thumbs, and has two additional controls located on the back in positions to be operated by the middle fingers of a user.

20 Claims, 2 Drawing Sheets

(56) References Cited

U.S. PATENT DOCUMENTS

| | | | | |
|---|---|---|---|---|
| 5,670,988 A * | 9/1997 | Tickle | G06F 3/0338 | 345/157 |
| 5,716,274 A * | 2/1998 | Goto | H01H 25/041 | 463/37 |
| D393,291 S * | 4/1998 | Kung | D14/401 | |
| 5,773,769 A * | 6/1998 | Raymond | H01H 21/86 | 178/102 |
| 5,820,462 A * | 10/1998 | Yokoi | A63F 13/06 | 463/37 |
| 5,853,326 A * | 12/1998 | Goto | A63F 13/24 | 463/37 |
| 5,874,906 A * | 2/1999 | Willner | G06F 3/0219 | 341/20 |
| D409,183 S * | 5/1999 | Chen | D14/401 | |
| D410,970 S * | 6/1999 | Larian | D21/329 | |
| 5,923,317 A * | 7/1999 | Sayler | A63F 13/06 | 345/156 |
| 5,984,548 A * | 11/1999 | Willner | G06F 3/0219 | 348/E5.103 |
| 5,984,785 A * | 11/1999 | Takeda | A63F 13/02 | 463/38 |
| 5,989,123 A * | 11/1999 | Tosaki | A63F 13/803 | 463/37 |
| D419,985 S * | 2/2000 | LaCelle | D14/401 | |
| 6,019,680 A * | 2/2000 | Cheng | A63F 13/06 | 463/37 |
| 6,102,803 A * | 8/2000 | Takeda | A63F 13/02 | 463/38 |
| D431,604 S * | 10/2000 | Chan | D14/413 | |
| 6,261,180 B1 * | 7/2001 | Lebensfeld | A63F 9/0291 | 463/49 |
| 6,280,327 B1 * | 8/2001 | Leiter | A63F 13/06 | 463/39 |
| 6,362,813 B1 * | 3/2002 | Worn | B25J 9/1656 | 345/1.2 |
| 6,461,238 B1 * | 10/2002 | Rehkemper | A63F 13/08 | 463/6 |
| 6,512,511 B2 * | 1/2003 | Willner | A63F 13/06 | 345/169 |
| 6,549,191 B2 * | 4/2003 | Leman | G06F 3/0213 | 345/168 |
| 6,580,421 B1 * | 6/2003 | Leman | G06F 3/0202 | 345/168 |
| 6,682,426 B2 * | 1/2004 | Goto | G05G 9/047 | 463/37 |
| 6,760,013 B2 * | 7/2004 | Willner | G06F 3/0219 | 345/163 |
| 6,887,158 B2 * | 5/2005 | Goto | G05G 9/047 | 463/37 |
| 7,235,012 B2 * | 6/2007 | DiDato | A63F 13/06 | 463/38 |
| D572,710 S * | 7/2008 | Li | D14/401 | |
| 7,407,439 B1 * | 8/2008 | Ochoa | A63F 13/02 | 463/37 |
| 7,471,216 B2 * | 12/2008 | Chen | A63F 13/06 | 341/20 |
| 7,473,180 B2 * | 1/2009 | Himoto | A63F 13/02 | 463/37 |
| 7,488,254 B2 * | 2/2009 | Himoto | A63F 13/02 | 463/37 |
| 7,774,155 B2 * | 8/2010 | Sato | A63F 13/06 | 702/127 |
| 7,804,484 B2 * | 9/2010 | Martinez | G06F 3/0233 | 345/156 |
| 7,859,514 B1 * | 12/2010 | Park | G06F 3/023 | 345/156 |
| 7,927,216 B2 * | 4/2011 | Ikeda | A63F 13/06 | 463/37 |
| 7,942,745 B2 * | 5/2011 | Ikeda | A63F 13/235 | 463/38 |
| 7,976,385 B2 * | 7/2011 | Riggs | A63F 13/803 | 463/36 |
| 8,366,547 B2 * | 2/2013 | Haswell | A63F 13/803 | 463/37 |
| 8,493,326 B2 * | 7/2013 | Martinez | A63F 13/06 | 345/168 |
| 2001/0003713 A1 * | 6/2001 | Willner | A63F 13/24 | 463/37 |
| 2001/0008848 A1 * | 7/2001 | Armstrong | A63F 13/218 | 463/37 |
| 2001/0023205 A1 * | 9/2001 | Kikukawa | A63F 13/06 | 463/37 |
| 2002/0128064 A1 * | 9/2002 | Sobota | A63F 13/06 | 463/37 |
| 2005/0255918 A1 * | 11/2005 | Riggs | A47C 15/004 | 463/37 |
| 2006/0040740 A1 * | 2/2006 | DiDato | A63F 13/5258 | 463/37 |
| 2006/0116204 A1 * | 6/2006 | Chen | A63F 13/06 | 463/37 |
| 2008/0261695 A1 * | 10/2008 | Coe | A63F 13/24 | 463/37 |
| 2010/0073283 A1 * | 3/2010 | Enright | G06F 3/0383 | 345/156 |
| 2010/0298053 A1 * | 11/2010 | Kotkin | A63F 13/24 | 463/37 |
| 2012/0142417 A1 * | 6/2012 | Haswell | A63F 13/211 | 463/37 |

OTHER PUBLICATIONS

"Pimp your controller and smite your foes with the N-Control Avenger," by Darren Quick, published Feb. 4, 2011. Source:https://newatlas.com/x-box-360-n-control-avenger-price/17784/ (Year: 2011).*

"N-Control Avenger Xbox 360 attachment makes it look complicated, we go hands-on," by S. Buckley, published Jun. 15, 2011. Source: https://www.engadget.com/2011-06-14-n-control-avenger-xbox-360-attachment-makes-it-look-complicated.html (Year: 2011).*

"N-Control Avenger gives your Xbox 360 controller hair triggers," by S. Hollister, published Nov. 12, 2010. Source: https://www.engadget.com/2010-11-11-n-control-avenger-gives-your-xbox-360-controller-hair-triggers.html (Year: 2010).*

"N-Control Avenger is a Power-Enhancing Exo Suit for Xbox 360 Controller," published Nov. 12, 2010. Source: tps://www.coolthings.com/n-control-avenger/ (Year: 2010).*

* cited by examiner

CONTROLLER FOR VIDEO GAME CONSOLE

This application is a continuation of U.S. Ser. No. 14/754,789 filed on Jun. 30, 2015 (now U.S. Pat. No. 10,286,305), which is a continuation of U.S. Ser. No. 14/141,840 filed on Dec. 27, 2013 (now U.S. Pat. No. 9,089,770), which is a continuation of U.S. Ser. No. 13/162,727 filed on Jun. 17, 2011 (now U.S. Pat. No. 8,641,525).

BACKGROUND OF THE INVENTION

The present invention relates to video game consoles, in particular to hand held controllers for video game consoles.

Conventional controllers for most game consoles are intended to be held and operated by the user using both hands. A conventional controller will generally comprise a hard outer case with a plurality of controls mounted about the controller. Typically the controls include buttons, analogue control sticks, bumpers, and triggers. An example of a conventional controller is shown in FIG. 1.

As can be seen in FIG. 1, all of the controls are mounted on the front and top edge of the controller 1. Specifically, there are left and right analogue thumb sticks 2, 3 which normally control movement and are intended to be operated by the user's left and right thumb respectively. There are four buttons 4, located on a front right portion of the controller 1 which normally control additional actions and are intended to be operated by the user's right thumb. There is a direction pad 5 located on the lower portion of the front left of the controller 1. The direction pad 5 is intended to be operated by the user's left thumb, typically either as an alternative to the left thumb stick 2 or to provide additional actions. There is a left trigger 6, a right trigger 7, a left bumper 8, and a right bumper 9 located on the top edge of the controller 1. The left and right triggers 6, 7 are typically operated by the user's index fingers. The left and right bumpers 8, 9 may also be operated by the user's index fingers.

The only way to operate the four buttons 4 is for the user to remove his or her right thumb from the right thumb stick 3. This takes time and, in some games, can cause a loss of control. This is a particular problem in games where the right thumb stick 3 is used for aiming. A similar problem may arise in games where the direction pad 5 provides additional actions and the user has to remove his or her thumb from the left thumb stick 2 in order to operate the direction pad 5.

In light of the above, there is a need for an improved controller which removes the need for a user to remove his or her thumb from the left or right thumb stick 2, 3 in order to operate additional actions controlled by the four buttons 4 and/or the direction pad 5.

SUMMARY OF THE INVENTION

The present invention provides a hand held controller for a video game console having a hard outer case and a plurality of controls located on the front and top edge of the controller. The controller is shaped to be held in both hands of the user such that the user's thumbs are positioned to operate controls located on the front of the controller and the user's index fingers are positioned to operate controls located on the top edge of the controller. The controller further includes one or more additional controls located on the back of the controller in a position to be operated by the user's other fingers.

In one embodiment, each additional control is an elongate member which is inherently resilient and flexible such that it can be displaced by a user to activate control function.

Preferably, each elongate member is mounted within a respective recess located in the case of the controller.

Preferably, each elongate member comprises an outermost surface which is disposed in close proximity to the outermost surface of the controller such that the user's finger may be received in said respective recess.

Preferably, each elongate member has a thickness less than 10 mm thick, more preferably less than 5 mm thick, and most desirably between 1 mm and 3 mm.

Preferably, there are two additional controls which are elongate members that are parallel to each another. In another embodiment, the elongate members converge towards the front end of the controller with respect to one another.

Optionally, a portion of each of the elongate members is in registry with a switch mechanism disposed within the controller, such that displacement of the elongate member activates the switch mechanism.

Optionally, a switch mechanism is disposed between the elongate members and an outer surface of the controller.

The controller of the present invention may be very similar to controllers according to the prior art. In particular, the outer case of the controller and the type, number and positioning of the controls located on the front and top edge of the controller may be the same as a controller according to the prior art, as described above and as illustrated in the figures.

The controller of the present invention is particularly advantageous over controllers according to the prior art as it comprises one or more additional controls located on the back of the controller in a position to be operated by middle fingers of a user. The additional controls may either replicate the functions of one or more of the controls located on the front or top edge of the controller or provide additional functionality.

In a preferred embodiment of the invention the additional controls replicate the function of a control located on the front of the controller. This means that a user does not need to remove his or her thumb from one of the thumb sticks in order to operate the buttons and/or direction pad located on the front of the controller and can instead perform the function by manipulating an additional control located on the back of the controller with a finger.

Alternatively, the additional controls may provide additional functionality in that they do not replicate the function of controls located on the front or top of the controller but may perform different functions. In this manner a controller according to the present invention may provide more functions than prior art controllers.

Preferably, the controls located on the back of the controller are paddle levers. Suitable paddle levers may be formed integrally with the outer case of the controller or may be substantially separate from the outer case. This may be done in any manner apparent to the person skilled in the art. However, it is to be appreciated that the additional controls may comprise any other control suitable for use by a hand held controller.

Advantageously, if the additional controls are paddle levers, they will be formed such that they are substantially vertically aligned with respect to the controller. This may allow the most ergonomically efficient activation of the paddle levers by the middle fingers of the user.

Further features and advantages of the present invention will be apparent from the specific embodiment illustrated in the drawings and discussed below.

DETAILED DESCRIPTION OF THE INVENTION

The particular embodiment described below and illustrated by FIGS. 2 and 3 serves to further illustrate the invention, to provide those of ordinary skill in the art with a complete disclosure and description of the devices claimed herein, and is not intended to limit the scope of the invention. For example, the additional controls are described below as two paddle levers but the term "control" as used in the claims, unless otherwise made clear in the claim, refers to paddle levers as well as other controls such as buttons, analogue control sticks, bumpers, and triggers.

Figure 1:
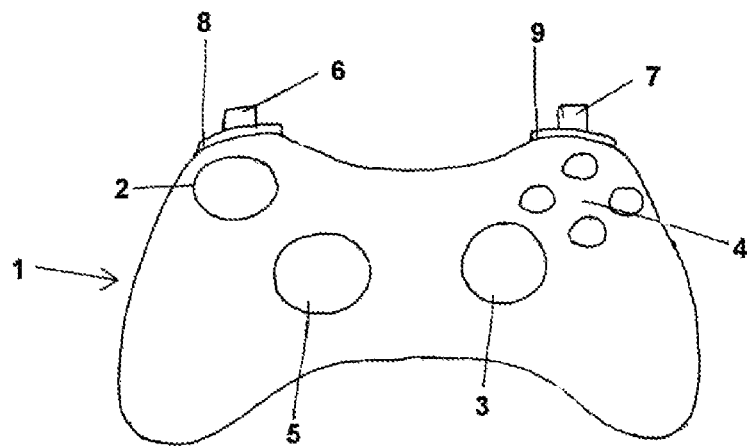
FIG. 1 is a schematic illustration of the front of a conventional game controller according to the prior art.
Figure 2:
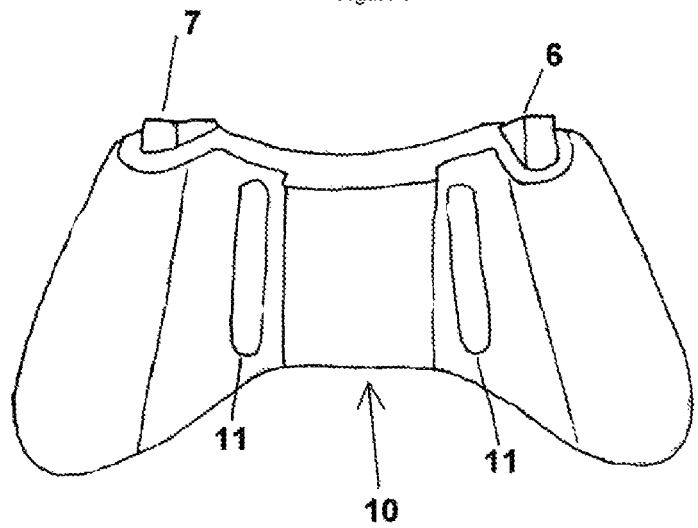
FIG. 2 is a schematic illustration of the back of a game controller according to the present invention.
Figure 3:
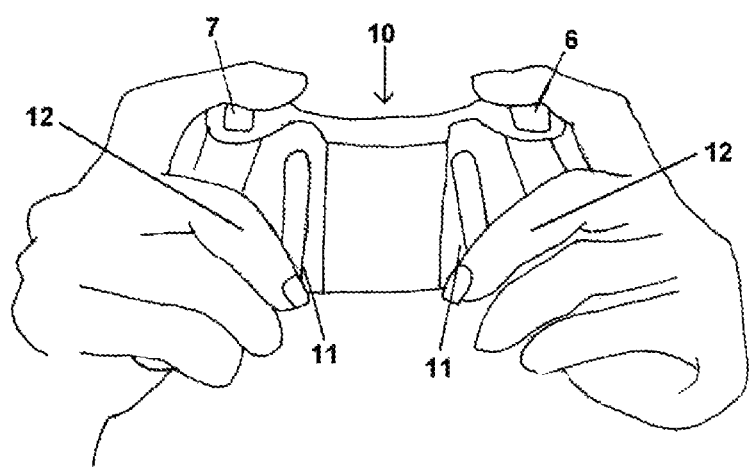
FIG. 3 is a schematic illustration of the back of a game controller according to the present invention as held and operated by a user.

The game controller 10 according to the present invention is illustrated in FIGS. 2 and 3. The front of the game controller 10 of FIGS. 2 and 3 is the same as a conventional controller 1, as illustrated in FIG. 1 and as discussed above. Therefore, where appropriate the same reference numerals have been used to indicate the features of the controller according to the present invention 10 that are identical to the features of a conventional controller 1.

Game controller 10 differs from the conventional controller 1 in that it additionally comprises two paddle levers 11 located on the back of the controller. The paddle levers 11 are vertically orientated with respect to the controller 10 and are positioned to be operated by the middle fingers of a user 12, as shown in FIG. 3.

In one embodiment the paddles 11 are formed from a thin flexible material such as a plastics material for example polyethylene. Preferably, the paddles 11 are less than 10 mm thick, but may be less than 5 mm thick, and more preferably are 3 mm thick or less.

The paddles 11 are inherently resilient, which means that they return to an unbiased position when not under load. A user may displace or depress either of the paddles 11 by engaging an outer surface thereof; such displacement causes the paddle 11 to activate a switch mechanism mounted within the body of the controller 10. The paddles 11 are mounted within recesses located on the case of the controller 10; and are disposed in close proximity to the outer surface of the controller body. In this way a user may engage the paddles 11 with the tips of the fingers, preferably the middle fingers, without compromising the user's grip on the controller 10. While the example shows the paddles 11 engaged by the middle fingers, they could also be engaged by the index, ring, or little fingers. The index fingers may also engage trigger style controls mounted on the top edge of the controller 10 while the thumbs may be used to activate controls on the front of the controller 10.

The paddles 11 are elongate in shape and substantially extend in a direction from the top edge to bottom edge of the controller 10. In one embodiment the paddles are orientated parallel with each other. In an alternative embodiment the paddles are orientated such that they converge towards the top edge with respect to each other. This elongate shape allows a user to engage the paddles with any of the middle, ring, or little finger; it also provides that different users having different size hands can engage with the paddles in a comfortable position thereby reducing the effects of prolonged or repeated use such as repetitive strain injury.

In one embodiment, the paddle levers 11 replicate the functions of two of the four buttons 4 located on the front of the controller 10 and thereby allow a user to operate the functions of the relevant buttons using his or her middle fingers 12, without the need to remove either of his or her thumbs from the left or right thumb stick 2, 3. In alternative embodiments a paddle lever 11 may activate a new function not activated by a control on the front or top edge of the controller 10.

It is envisaged that the paddles 11 could be fitted to an existing controller 10. In such embodiments the paddles would be mounted on the outer surface of the controller body by means of a mechanical fixing such as a screw or bolt or alternatively bonded or welded to the controller body by adhesive or other suitable means. A switch mechanism would be mounted within the controller in vertical registry with a portion of each paddle. A portion of the switch mechanism may extend through the controller body and be disposed in close proximity or in contact with an innermost surface of the paddle 11.

In alternative embodiments it is envisaged that the paddles 11 would be integrally formed with the controller body, the paddles 11 being configured to be resilient and flexible such that they can be depressed by a user to activate a switch mechanism. This could be achieved by moulding the controller body to have a U-shaped slot extending through the controller body; alternatively a U-shaped slot could be cut into the controller body after the moulding process. Preferably, the paddies 11 would comprise a raised outermost surface with respect to the surrounding area such that a user may locate the paddles 11. This may be achieved by moulding the paddle such that is thicker than the surrounding area. It will be recognised that as used herein, directional references such as "top", "bottom", "front", "back", "end", "side", "inner", "outer", "upper", and "lower" do not limit the respective features to such orientation, but merely serve to distinguish these features from one another.

Modifications and variations of the present invention will be apparent to those skilled in the art from the forgoing detailed description. All modifications and variations are intended to be encompassed by the following claims. All publications, patents, and patent applications cited herein are hereby incorporated by reference in their entirety.

The invention claimed is:

1. A hand held apparatus for providing a user input to a computer program for controlling the computer program, the apparatus comprising:
   a case configured to be supported only by a user's hands during operation of the apparatus, the case comprising:
      a front face and a back face opposite the front face, wherein the front face contains a plurality of front controls configured to be activated by the user's thumbs during operation of the apparatus; and
      a top face and a bottom opposite the top face, wherein the top face contains a plurality of top controls configured to be activated by the user's index fingers during operation of the apparatus;
   a first back control comprising a first paddle lever located at the back face and positioned to allow activation by the user's middle, ring, or pinkie finger during operation of the apparatus, the first back control having a first vertical dimension measured from a top edge of the back face adjacent to the top face of the case to a bottom edge of the back face adjacent to the bottom of the case, the first vertical dimension being at least one fourth of a distance from the top edge of the back face to the bottom edge of the back face; and a second back control comprising a second paddle lever located at the back face and positioned to allow activation by the user's middle, ring, or pinkie finger during operation of the apparatus, the second back control having a second vertical dimension measured from the top edge of the back face to the bottom edge of the back face, the second vertical dimension being at least one fourth of the distance from the top edge of the back face to the bottom edge of the back face, wherein the first and second paddle levers are separately configured to bend when individually activated by the user's middle, ring, or pinkie finger during operation and to return to an unbent position when released.

2. The apparatus of claim 1, wherein each of the first back control and second back control is configured to replicate one of the plurality of front controls and top controls.

3. The apparatus of claim 1, further comprising:
a first handle adjacent a first side edge of the back face; and
a second handle adjacent a second side edge of the back face, wherein the first side edge is opposite the second side edge,
wherein at least a portion of the back face forms a recess between the first handle and the second handle, the recess configured to receive the user's fingers when the apparatus is grasped by the user, wherein at least part of the first back control and the second back control are located in the recess.

4. The apparatus of claim 1, wherein the first paddle lever and the second paddle lever are formed in flexible portions of the back face.

5. The apparatus of claim 4, wherein the first paddle lever is in communication with a first sensor configured to detect activation of the first paddle lever and the second paddle lever is in communication with a second sensor configured to detect activation of the second paddle lever.

6. The apparatus of claim 1, wherein an uppermost surface of the first back control is raised with respect to an outer surface of the back face and wherein an uppermost surface of the second back control is raised with respect to the outer surface of the back face.

7. The apparatus of claim 1, wherein a portion of a bottom surface of the first paddle lever is in communication with a first switch located inside the apparatus and a portion of a bottom surface of the second paddle lever is in communication with a second switch located inside the apparatus.

8. The apparatus of claim 7, wherein an activator portion of the first switch extends into or through the outer case with a distal end in close proximity to or in contact with the bottom surface of the first paddle lever, and wherein an activator portion of the second switch extends into or through the outer case with a distal end in close proximity to or in contact with the bottom surface of the second paddle lever.

9. The apparatus of claim 1, wherein:
the first vertical dimension of the first back control comprises at least one half of the distance from the top edge of the back face to the bottom edge of the back face, and the second vertical dimension of the second back control comprises at least one half of the distance from the top edge of the back face to the bottom edge of the back face.

10. The apparatus of claim 1, wherein:
the first back control has a first horizontal dimension perpendicular to the first vertical dimension of the first back control, wherein the first horizontal dimension is different from the first vertical dimension, and
the second back control has a second horizontal dimension perpendicular to the second vertical dimension of the second back control, wherein the second horizontal dimension is different from the second vertical dimension.

11. The apparatus of claim 1, wherein the computer program is a game program.

12. The apparatus of claim 1, wherein the apparatus comprises a game controller configured to operate with a computing device.

13. A hand-held input device for providing a user input to a computer program for controlling the computer program, the hand-held input device comprising:
an outer case configured to be supported only by the user's hands during operation of the hand-held input device, the outer case comprising:
a front face and a back face opposite the front face, wherein the front face contains a plurality of front controls configured to be activated by the user's thumbs during operation of the hand-held input device;
a top face and a bottom opposite the top face, wherein the top face contains a plurality of top controls configured to be activated by the user's index fingers during operation of the hand-held input device;
a first handle adjacent a first side edge of the back face; and
a second handle adjacent a second side edge of the back face, wherein the first side edge is opposite the second side edge and at least a portion of the back face forms a recess between the first handle and the second handle, the recess configured to receive the user's fingers; and
a first back control located at the back face and in communication with a first sensor of the device, the first back control comprising a first flexible portion of the back face configured to deflect or bend when activated by the user's middle, ring, or pinkie finger during operation of the hand-held input device.

14. The hand-held input device of claim 13, wherein the first back control has a first horizontal dimension perpendicular to a first vertical dimension of the first back control and wherein the first horizontal dimension is different from the first vertical dimension.

15. The input device of claim 13, wherein the first sensor comprises a first switch located inside the device and an activator portion of the first switch is in close proximity to or in contact with a bottom surface of the first back control.

16. The hand-held input device of claim 13, further comprising:
a second back control located at the back face and in communication with a second sensor of the device, the second back control comprising a second flexible portion of the back face configured to deflect or bend independently of the first back control when the second control is activated by the user's middle, ring, or pinkie finger during operation of the second back control.

17. The input device of claim 16, wherein the second back control has a second horizontal dimension perpendicular to a second vertical dimension of the second back control and wherein the second horizontal dimension is different from than the second vertical dimension.

18. The hand-held input device of claim 16, wherein:
the first vertical dimension of the first back control comprises at least one fourth of the distance from a top edge of the back face to a bottom edge of the back face, and
the second vertical dimension of the second back control comprises at least one fourth of the distance from the top edge of the back face to the bottom edge of the back face.

19. The input device of claim 16, wherein the first back control and second back control are each configured to replicate a desired one or more of the plurality of front controls and top controls.

20. The input device of claim 16, wherein the second sensor comprises a second switch located inside the device and an activator portion of the second switch is in close proximity to or in contact with a bottom surface of the second back panel.

\* \* \* \* \*